(12) United States Patent
Zhou (10) Patent No.: US 10,313,611 B2
(45) Date of Patent: Jun. 4, 2019

(54) IMAGE SENSOR WITH PIXEL BINNING DEVICE

(71) Applicant: UNITED MICROELECTRONICS CORP., Hsin-Chu (TW)

(72) Inventor: Zhibiao Zhou, Singapore (SG)

(73) Assignee: UNITED MICROELECTRONICS CORP., Hsin-Chu (TW)

( * ) Notice: Subject to any disclaimer, the term of this patent is extended or adjusted under 35 U.S.C. 154(b) by 0 days.

(21) Appl. No.: 15/613,147

(22) Filed: Jun. 3, 2017

(65) Prior Publication Data

US 2018/0352176 A1 Dec. 6, 2018

(51) Int. Cl.
*H04N 5/347* (2011.01)
*H04N 5/232* (2006.01)
*H04N 5/369* (2011.01)
*H04N 5/378* (2011.01)

(52) U.S. Cl.
CPC ......... *H04N 5/347* (2013.01); *H04N 5/23245* (2013.01); *H04N 5/3696* (2013.01); *H04N 5/378* (2013.01)

(58) Field of Classification Search
CPC ...................................................... H04N 5/347
USPC .............................. 348/294, 311; 250/208.1
See application file for complete search history.

(56) References Cited

U.S. PATENT DOCUMENTS

| | | | | |
|---|---|---|---|---|
| 5,973,311 A * | 10/1999 | Sauer | ................ | H01L 27/14665 250/208.1 |
| 6,947,086 B1 * | 9/2005 | Rutten | ..................... | H04N 5/32 250/208.1 |
| 7,091,466 B2 | 8/2006 | Bock | | |
| 8,759,736 B2 * | 6/2014 | Yoo | ...................... | H04N 5/3742 250/208.1 |
| 9,391,111 B1 * | 7/2016 | Mabuchi | ........... | H01L 27/14634 |
| 9,431,441 B1 | 8/2016 | Zhou | | |
| 2002/0085106 A1 * | 7/2002 | Beiley | ..................... | H04N 5/353 348/296 |
| 2002/0186312 A1 * | 12/2002 | Stark | ...................... | H04N 5/345 348/302 |
| 2005/0133687 A1 * | 6/2005 | Bock | ................. | H01L 27/14609 250/208.1 |
| 2009/0128678 A1 * | 5/2009 | Kitami | ............... | H04N 5/23245 348/308 |
| 2010/0163711 A1 * | 7/2010 | Kondo | .................... | H04N 5/343 250/208.1 |
| 2011/0013033 A1 * | 1/2011 | Mori | ................... | H04N 5/23212 348/220.1 |
| 2011/0101205 A1 * | 5/2011 | Tian | ....................... | H04N 5/332 250/208.1 |
| 2013/0284892 A1 * | 10/2013 | Kyushima | ........ | H01L 27/14658 250/208.1 |

(Continued)

*Primary Examiner* — Anthony J Daniels (74) *Attorney, Agent, or Firm* — Winston Hsu (57) ABSTRACT

An image sensor includes a first pixel and a second pixel. The first pixel receives a first signal sensed by a first photodiode. The second pixel receives a second signal sensed by a second photodiode. A pixel binning device includes a first transistor, a second transistor and a binning circuit, wherein the first transistor switchably couples to the first pixel to transfer the first signal, the second transistor switchably couples to the second pixel to transfer the second signal, and the binning circuit couples to the first transistor and the second transistor to bin the first signal and the second signal.

17 Claims, 10 Drawing Sheets

(56) References Cited

U.S. PATENT DOCUMENTS

2015/0009385 A1* 1/2015 Tsukida ................ H04N 5/374
348/308

* cited by examiner

IMAGE SENSOR WITH PIXEL BINNING DEVICE

BACKGROUND OF THE INVENTION

1. Field of the Invention

The present invention relates to an image sensor, and more particularly to an image sensor with a pixel binning device.

2. Description of the Prior Art

Image sensors are used in videos and cameras. They can be realized in a number of forms including charge coupled devices (CCDs) and CMOS image sensors. These image sensors are based on a two dimensional array of pixels, wherein each pixel includes a sensing element that is capable of converting a portion of an optical image into an electronic signal.

Digital Cameras employing CMOS image sensor technology utilize image processing for adjusting the resolution of the camera. The image sensor can operate in several modes. Full resolution images can be captured for photography, and low resolution images are acquired for viewfinder or short video. Therefore, when the image sensor is in the video mode so that images can be acquired at high speed, the pixels will not be operated at full frame. Resolution of the video mode is much lower than resolution of the photography mode; pixels which are not used in the video mode are wasted.

SUMMARY OF THE INVENTION

Therefore, it is one objective of the present invention to make use of all pixels to increase the resolution of the video mode.

According to a preferred embodiment of the present invention, an image sensor includes a first pixel including a first photodiode and a first transistor module, wherein the first transistor module couples to the first photodiode to receive a first signal sensed by the first photodiode. A second pixel includes a second photodiode and a second transistor module, wherein the second transistor module couples to the second photodiode to receive a second signal sensed by the second photodiode. A pixel binning device includes a first transistor, a second transistor and a binning circuit, wherein the first transistor couples to the first transistor module in a switching manner to transfer the first signal, the second transistor couples to the second transistor module in a switching manner to transfer the second signal, and the binning circuit couples to the first transistor and the second transistor to bin the first signal and the second signal.

An image sensor includes a first pixel comprising a first photodiode and a first transistor module, wherein the first transistor module couples to the first photodiode to receive a first signal sensed by the first photodiode. A first sensing line couples to the first transistor module to transfer the first signal to a readout circuitry. A second pixel includes a second photodiode and a second transistor module, wherein the second transistor module couples to the second photodiode to receive a second signal sensed by the second photodiode. A pixel binning device includes a second transistor and a binning circuit, wherein the second transistor couples to the second transistor module in a switching manner to transfer the second signal, and the binning circuit couples the second transistor to the first sensing line to bin the second signal and the first signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
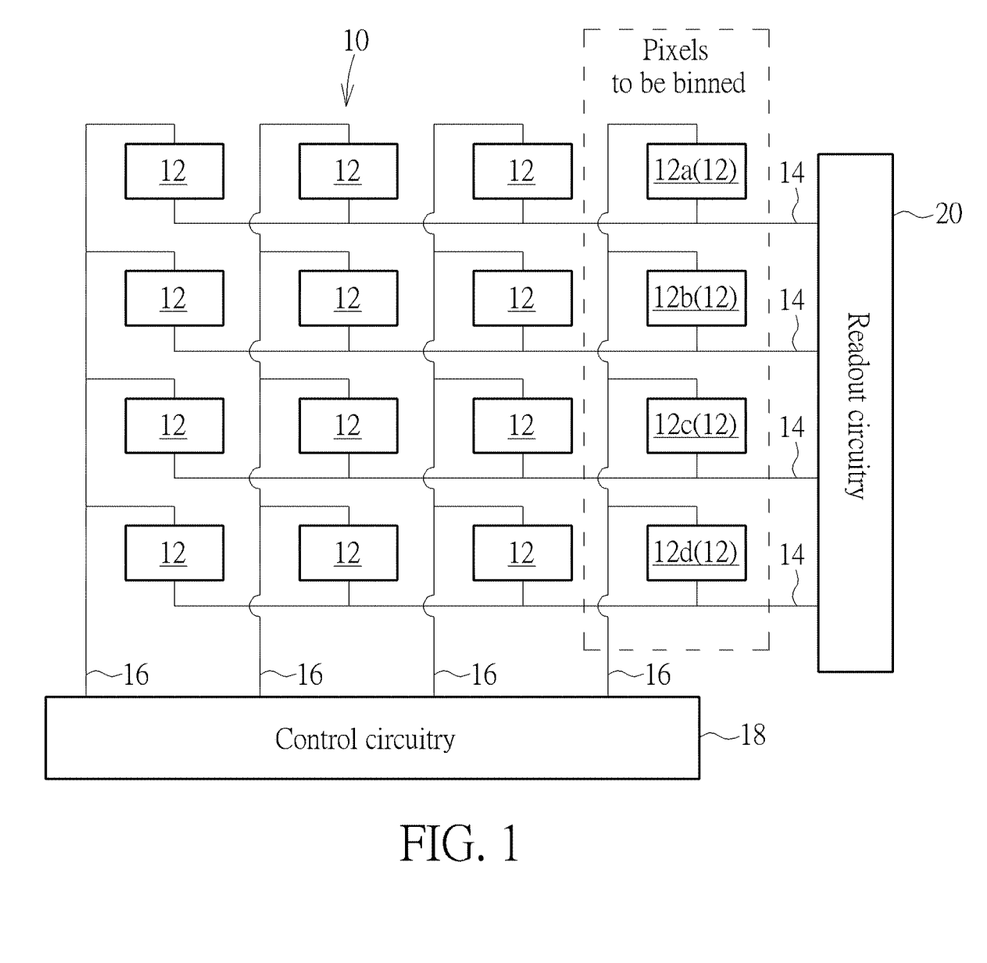
FIG. 1 depicts circuits of a pixel array and associated control circuitry and readout circuitry in an image sensor according to a preferred embodiment of the present invention.

FIG. 1 depicts circuits of a pixel array and associated control circuitry and readout circuitry in an image sensor according to a preferred embodiment of the present invention. As shown in FIG. 1, an image sensor may include a pixel array 10 containing numerous image sensor pixels 12. For example, the pixel array 10 may include hundreds or thousands of rows and columns of image sensor pixels 12. Although the pixel array is illustrated as a 4×4 array, other numbers of columns and rows are possible. In order to clearly describe the present invention, the image sensor pixel disposed at the rightmost column and topmost row is designated as numeral 12a, the image sensor pixel disposed in the same column and the next row with respect to the image sensor pixel 12a is designated as numeral 12b, the image sensor pixel disposed in the same column and the next row with respect to the image sensor pixel 12b is designated as numeral 12c, and the image sensor pixel disposed in the same column and the next row with respect to the image sensor pixel 12c is designated as numeral 12d.

Image sensor pixels 12 in the same row are coupled to the same sensing line 14, and image sensor pixels 12 in the same column are coupled to the same select line 16. Control circuitry 18 couples to the select line 16. Readout circuitry 20 couples to the sensing line 14. Furthermore, each row of the image sensor pixels 12 has its own sensing line 14, and each column of the image sensor pixels 12 has its own select line 16. Control circuitry 18 may be used to supply control signals such as reset, transfer and read control to the image sensor pixels 12. The readout circuitry 20 may read out signals of image sensor pixels 12. In one embodiment, readout circuitry 20 may read out the image sensor pixels 12 using a column readout, a serial readout, or other methods. In one embodiment, readout circuitry 20 includes amplification circuitry, analog-to-digital conversion circuitry, a holding capacitor or other elements.

Figure 2:
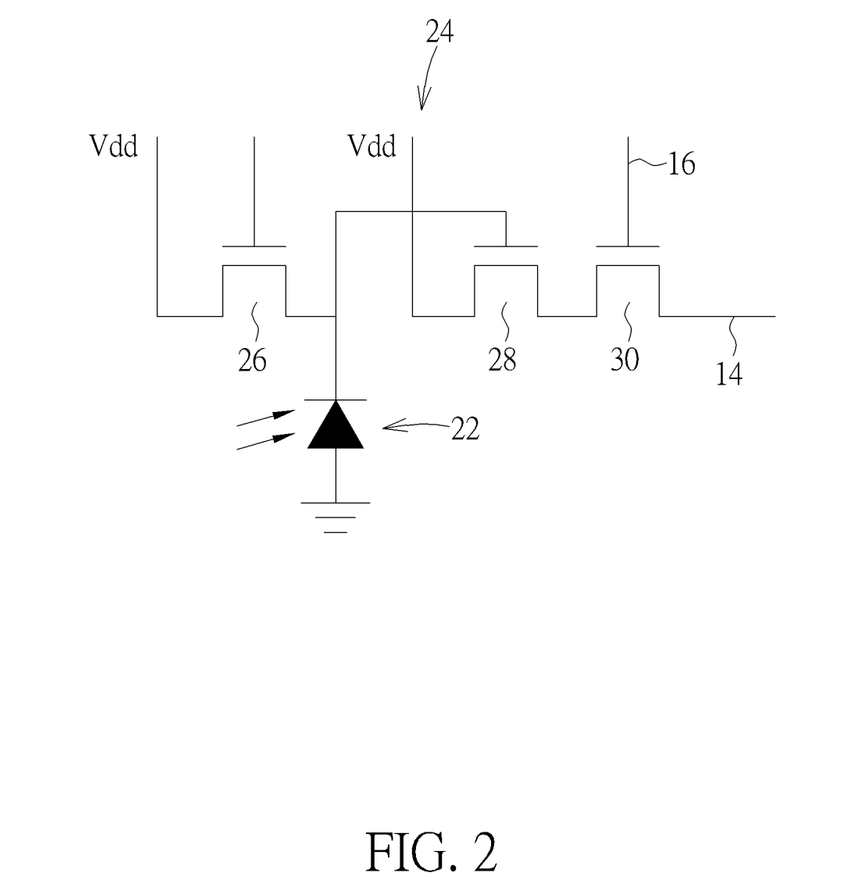
FIG. 2 depicts circuit diagrams of a three-transistor image sensor pixel according to a preferred embodiment of the present invention.
Figure 3:
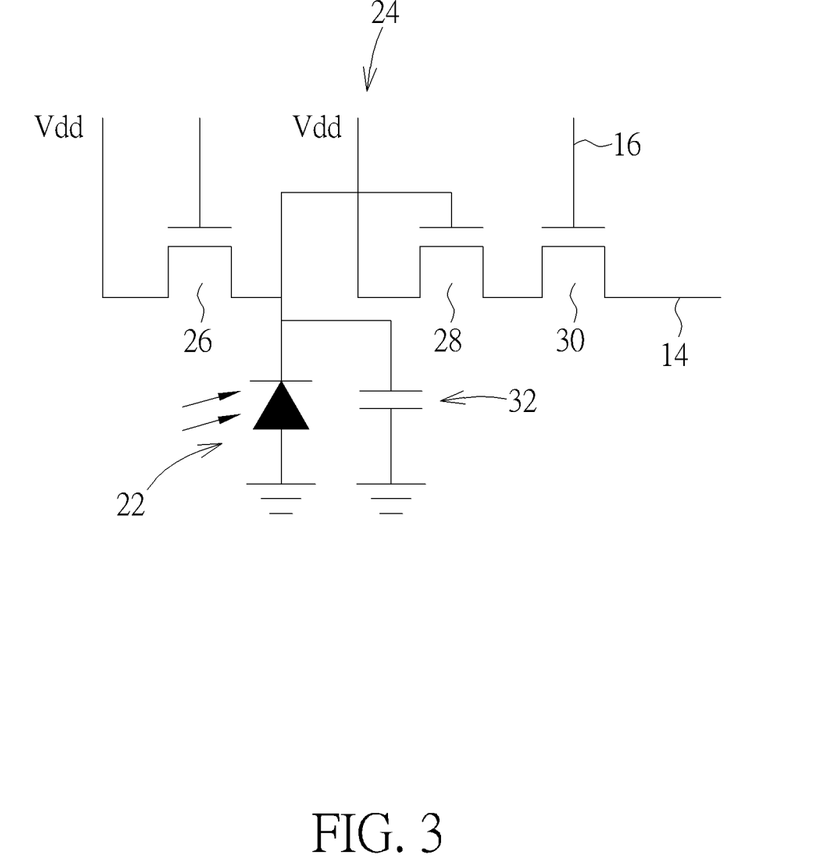
FIG. 3 depicts circuit diagrams of a three-transistor image sensor pixel according to another preferred embodiment of the present invention.
Figure 4:
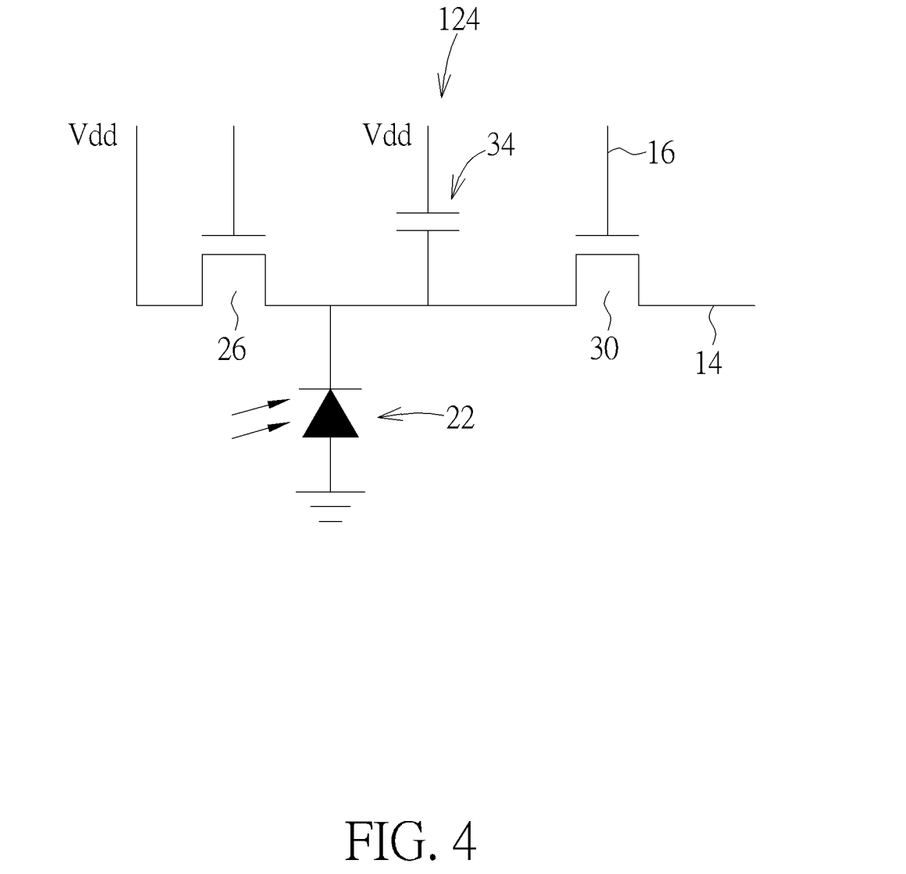
FIG. 4 depicts circuit diagrams of a two-transistor image sensor pixel according to a preferred embodiment of the present invention.
Figure 5:
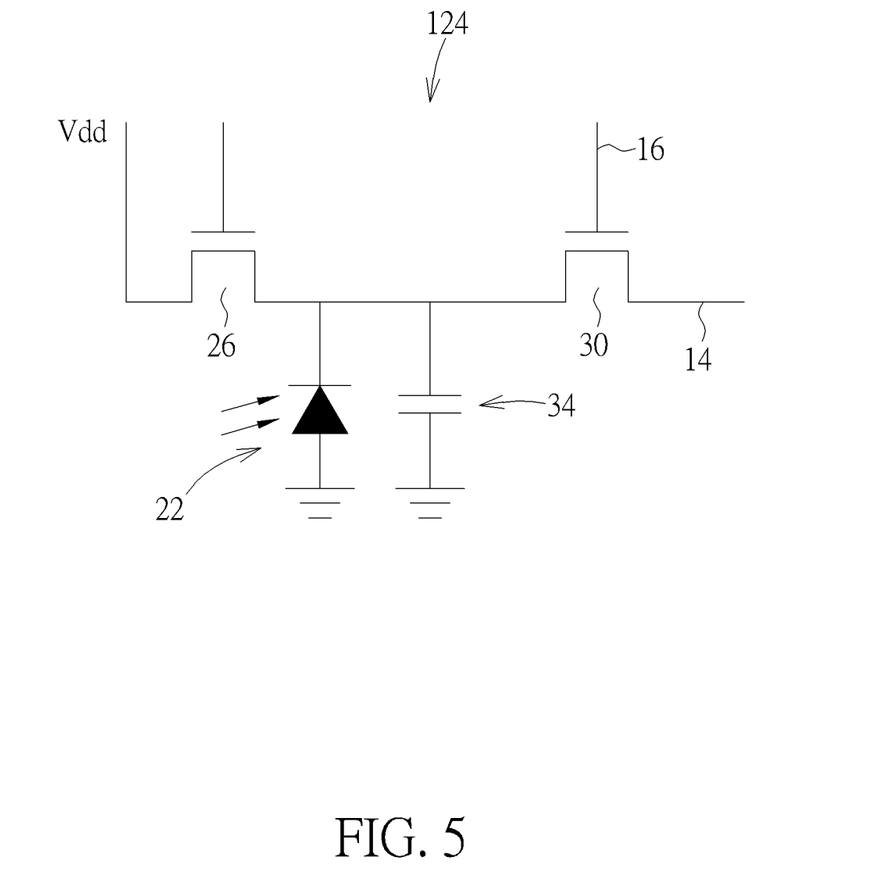
FIG. 5 depicts circuit diagrams of a two-transistor image sensor pixel according to another preferred embodiment of the present invention.

FIG. 2 depicts circuit diagrams of a three-transistor image sensor pixel according to a preferred embodiment of the present invention. FIG. 3 depicts circuit diagrams of a three-transistor image sensor pixel according to another preferred embodiment of the present invention, wherein like reference numerals are used to refer to like elements throughout. FIG. 4 depicts circuit diagrams of a two-transistor image sensor pixel according to a preferred embodiment of the present invention, wherein like reference numerals are used to refer to like elements throughout. FIG. 5 depicts circuit diagrams of a two-transistor image sensor pixel according to another preferred embodiment of the present invention, wherein like reference numerals are used to refer to like elements throughout.

Each of the image sensor pixels 12 may be expressed by a circuit shown in FIG. 2, FIG. 3, FIG. 4 or FIG. 5. The circuit of each image sensor pixel 12 includes a photodiode 22 and a transistor module 24. As shown in FIG. 2, the transistor module 24 may be a three-transistor module which includes a reset transistor 26, an amplifier transistor 28, and a select transistor 30. During operation, the amplifier transistor 28 receives a signal from the photodiode 22. The amplifier transistor 28 is coupled between a power rail Vdd and the select transistor 30. The reset transistor 26 is coupled to a power rail Vdd and the photodiode 22. The reset transistor 26 is used to discharge or charge the photodiode 22. The select transistor 30 couples between the amplifier transistor 28 and the readout circuitry 20 to send out the signal from the photodiode 22. The select transistor 30 couples to the readout circuitry 20 through the sensing line 14. A gate of the select transistor 30 couples to the control circuitry 18 through the select line 16. The control circuitry 18 sends signals to select which columns of the image sensor pixels 12 are to be read out.

The difference between the circuit diagram in FIG. 2 and FIG. 3 is that FIG. 3 shows a capacitor 32 coupling to the photodiode 22. As shown in FIG. 4, the transistor module 124 in FIG. 4 is a two-transistor module; therefore the amplifier transistor is not used, and a capacitor 34 couples between the photodiode 22, the power rail Vdd and the select transistor 30. The difference between the circuit in FIG. 4 and FIG. 5 is that FIG. 5 shows the capacitor 34 couples between the photodiode 22, a ground voltage and the select transistor 30. The transistors 26, 28, 30 shown in FIG. 2, FIG. 3, FIG. 4 or FIG. 5 may be MOS transistors or OSFETs (oxide semiconductor field effect transistors) based on different product requirements.

The following description will introduce a pixel binning device for merging the signals of numerous image sensor pixels according to a preferred embodiment of the present invention. To exemplify the usage of the pixel binning device, the rightmost column of the pixel array is selected to be binned. In other embodiments, different columns or rows can be selected. Furthermore, different numbers of columns or rows can also be selected. Alternatively, the entire pixel array can be selected to be binned as well. The transistors which are used in the pixel binning device may be MOS transistors or OSFETs based on different product requirements. Since the OSFETs suppress short channel effect, they have the advantage of extremely low off-state current. Therefore, power consumption of the pixel binning device is efficaciously and extraordinarily reduced.

Figure 6:
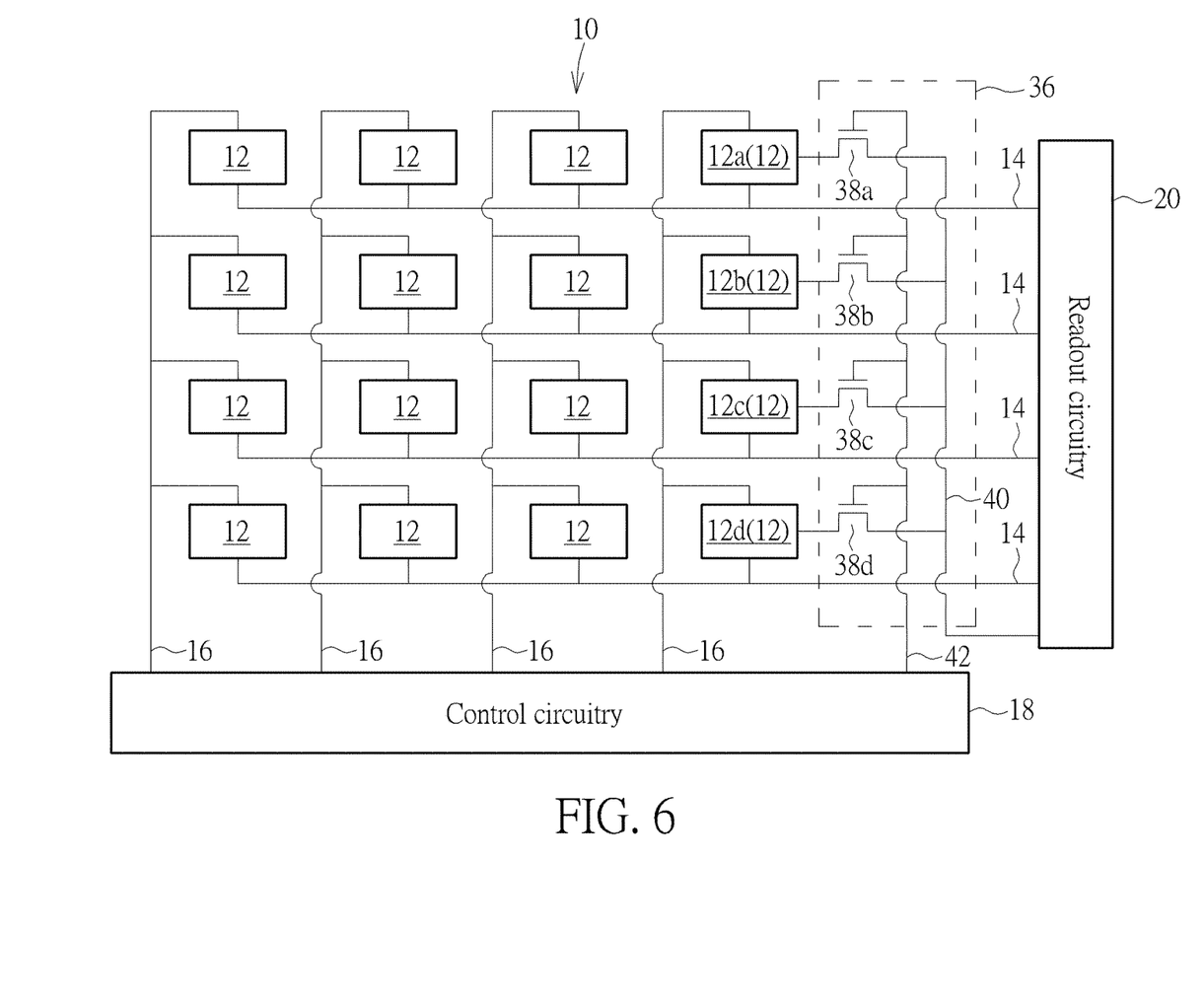
FIG. 6 depicts circuits of a pixel array and associated pixel binning device according to a preferred embodiment of the present invention.
Figure 7:
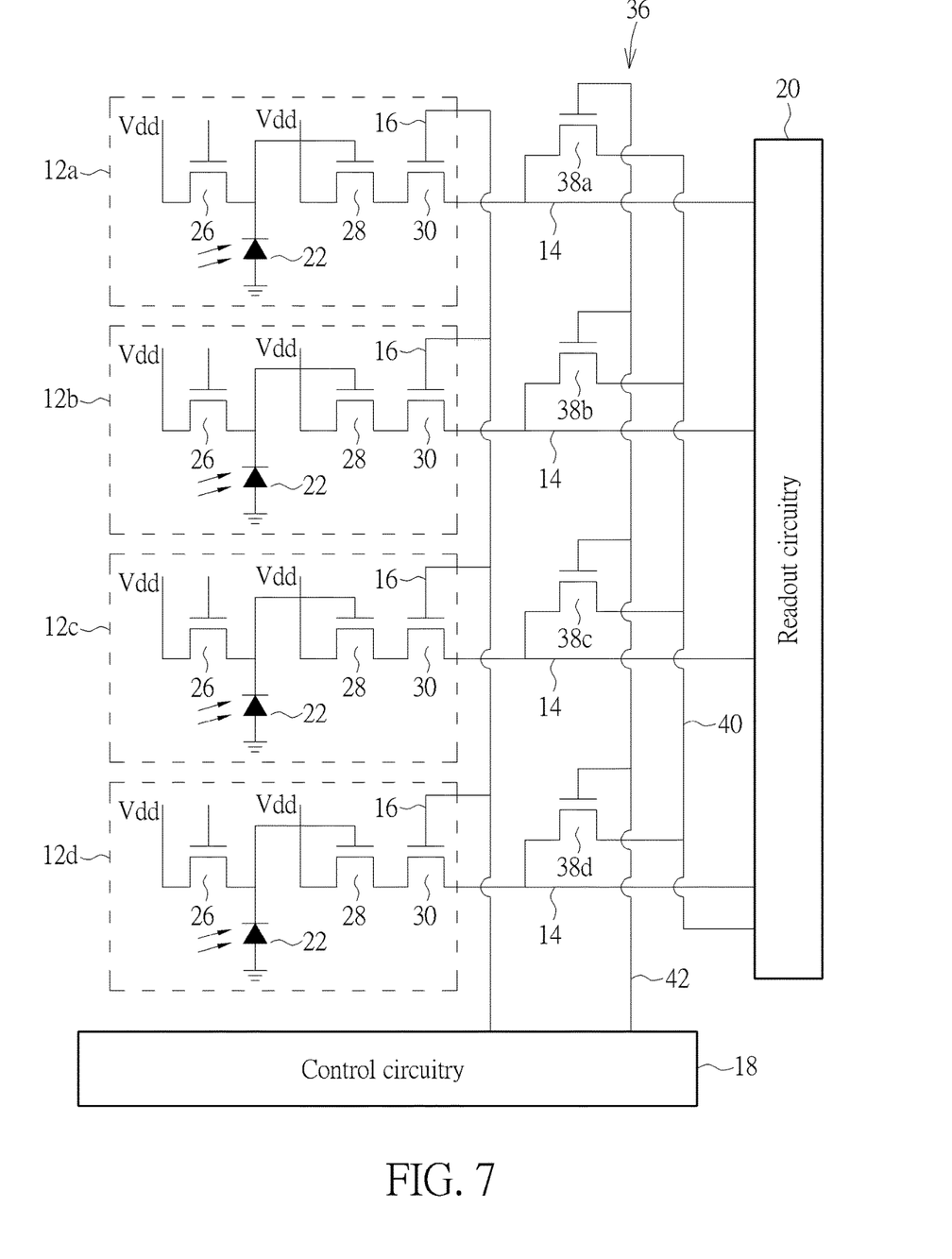
FIG. 7 depicts a circuit diagram of the pixel binning device and the rightmost column of the pixel array.

FIG. 6 depicts circuits of a pixel array and associated pixel binning device according to a preferred embodiment of the present invention. FIG. 7 shows a circuit diagram of the pixel binning device and the rightmost column of the pixel array. Please refer to FIG. 1 and FIG. 6. The pixel binning device 36 couples to the rightmost column of the pixel array 10. The pixel binning device 36 includes numerous transistors, a binning circuit 40 and a common select line 42. In detail, each of the image sensor pixels 12 in the rightmost column of the pixel array 10 is coupled to one transistor. For example, the image sensor pixel 12a couples to the transistor 38a, and the image sensor pixel 12b couples to the transistor 38b. The image sensor pixel 12c couples to the transistor 38c, and the image sensor pixel 12d couples to the transistor 38d. During operation, the signals received from the image sensor pixels 12a/12b/12c/12d can be transferred to the corresponding transistor. For example, the signal received from the image sensor pixel 12a can be transferred to the transistor 38a and the signal received from the image sensor pixel 12b can be transferred to the transistor 38b. Similarly, signals of image sensor pixels 12c/12d are transferred to the corresponding transistor. Later, the signals received by the transistors 38a/38b/38c/38d are collected by the binning circuit 40. The binning circuit 40 bins the signals and send the binned signal to the readout circuit 20.

Please refer to FIG. 6 and FIG. 7. A common select line 42 couples to gates of the transistors 38a/38b/38c/38d. The common select line 42 can simultaneously switch on or off the transistors 38a/38b/38c/38d. When the transistors 38a/38b/38c/38d in the pixel binning device 36 are switched on, this means the pixel array 10 is in a video mode, and a signal of the rightmost column of the pixel array 10 is binned by the pixel binning device 36. When the transistors 38a/38b/38c/38d in the pixel binning device 36 are switched off, this means the pixel array 10 is in a photography mode, and signals of the rightmost column of the pixel array 10 go through their own sensing line 14 to the readout circuit 20, so the signals of the rightmost column of the pixel array 10 will not be merged.

In FIG. 7, the circuit in FIG. 2 is applied to the image sensor pixels; however, circuits in FIG. 3, FIG. 4 or FIG. 5 can also be applied to the image sensor pixels. As shown in FIG. 7, the transistor 38a receives the signal by coupling to a drain of the select transistor 30 of the image sensor pixel 12a. In detail, the sensing line 14 and the transistor 38a are both coupled to the drain of the select transistor 30 of the image sensor pixel 12a. The transistors 38b/38c/38d are coupled to the corresponding drains of the select transistors 30 as well. Detail description is omitted here.

Figure 8:
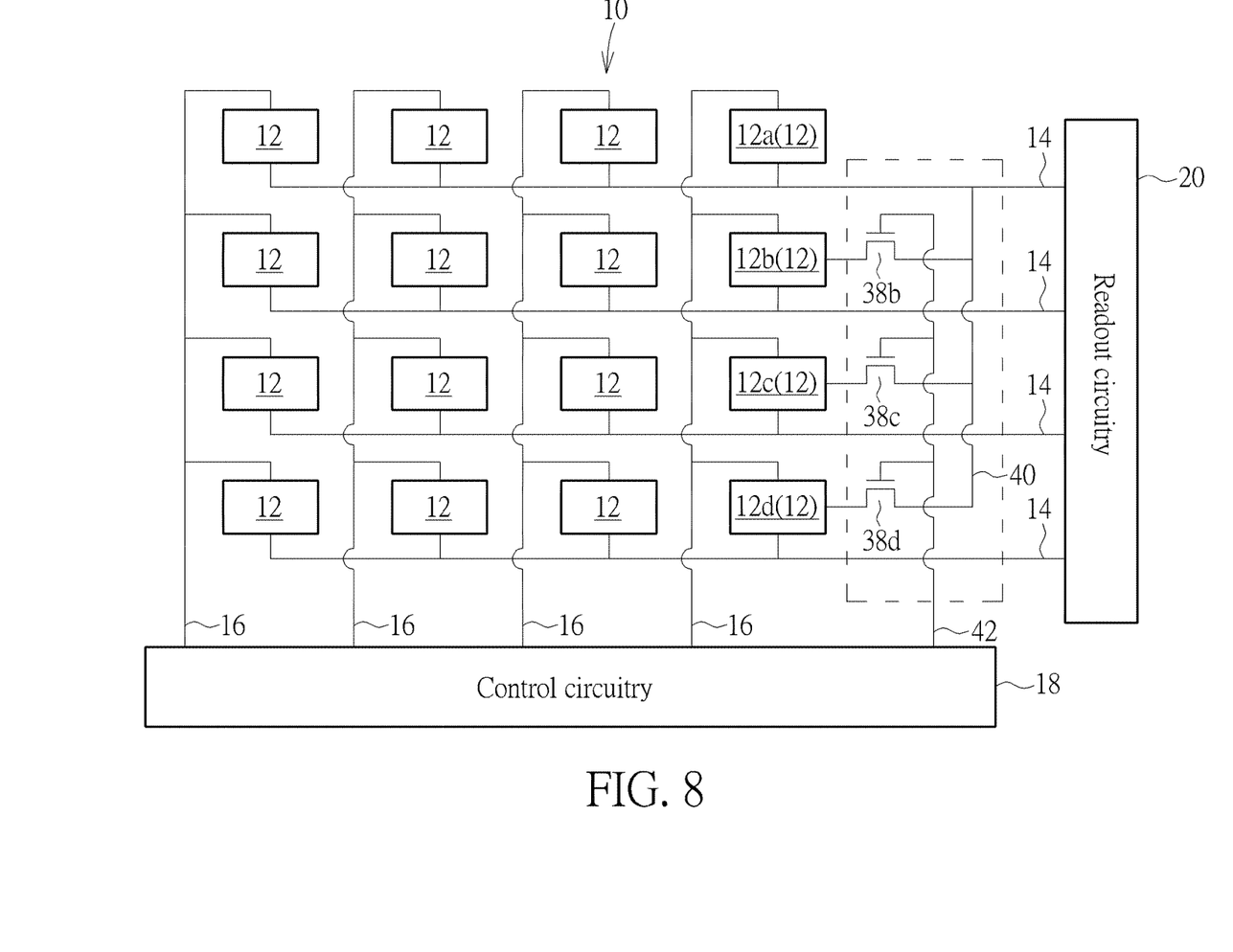
FIG. 8 depicts a circuit of a pixel array and associated pixel binning device according to another preferred embodiment of the present invention.

FIG. 8 depicts a circuit of a pixel array and associated pixel binning device according to another preferred embodiment of the present invention, wherein like reference numerals are used to refer to like elements throughout; an accompanying explanation is therefore omitted. The rightmost column of the pixel array 10 in FIG. 6 is selected to be binned. The pixel binning device 36 in this embodiment includes numerous transistors, a binning circuit 40, a common select line 42 and one of the sensing lines 14 belonging to one of the image sensor pixels of the rightmost column. One of the image sensor pixels 12 of the rightmost column does not have a corresponding transistor in the pixel binning device 36. For example, the image sensor pixel 12a in the first row and first column does not have a corresponding transistor in the pixel binning device 36. The rest of the image sensor pixels 12b/12c/12d have their corresponding transistor. For example, the image sensor pixel 12b couples to the transistor 38b, the image sensor pixel 12c couples to another transistor 38c, and the image sensor pixel 12d couples to the transistor 38d. The sensing line 14 of the image sensor pixel 12a couples to the binning circuit 40 of the pixel binning device 36. The binning circuit 40 bins the signals from the transistor 38b, the transistor 38c, and transistor 38d in the rightmost column. Then, the binned signal is sent to readout circuitry 20 through the sensing line 14 of the image sensor pixel 12a in the first row and first column. The image sensor pixels 12 at different positions can be selected to offer its sensing line 14 for signal merging; note that this is not limited to the sensing line 14 of the image sensor pixel 12a in the first row and first column.

A common select line 42 couples to gates of the transistors 38b/38c/38d in the pixel binning device 36. The common select line 42 can simultaneously switch on or off the transistor 38b, the transistor 38c and transistor 38d in the pixel binning device 36. When the transistors 38b/38c/38d in the pixel binning device 36 are switched on, the signal of the rightmost column of the pixel array 10 is binned by the pixel binning device 36. When the transistors 38b/38c/38d in the pixel binning device 36 are switched off, signals of the rightmost column of the pixel array 10 go through their own sensing line 14 to the readout circuit 20, so the signals of the rightmost column of the pixel array will not be merged.

The pixel binning device 36 of the present invention can be applied to a backside illumination (BSI) image sensor or a front-side illumination (FSI) image sensor. If the pixel binning device 36 is applied to a BSI image sensor, the pixel binning device 36 can be stacked on the image sensor pixels 12 to which the pixel binning device 36 couples. If the pixel binning device 36 is applied to a FSI image sensor, the pixel binning device 36 can be arranged on a peripheral region of the image sensor which will not block incident light.

Figure 9:
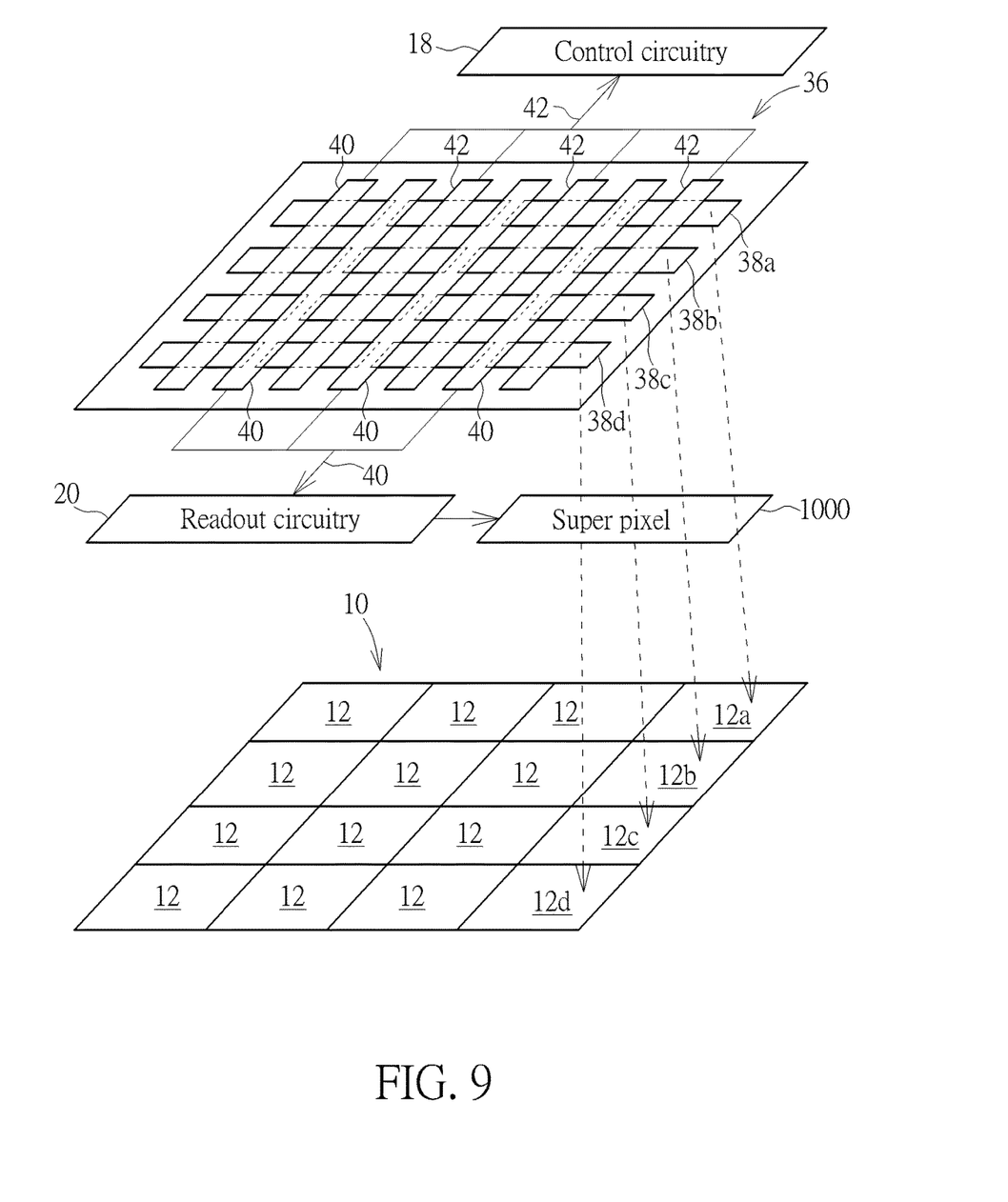
FIG. 9 depicts an exploded view of a layout of a pixel binning device and a pixel array.
Figure 10:
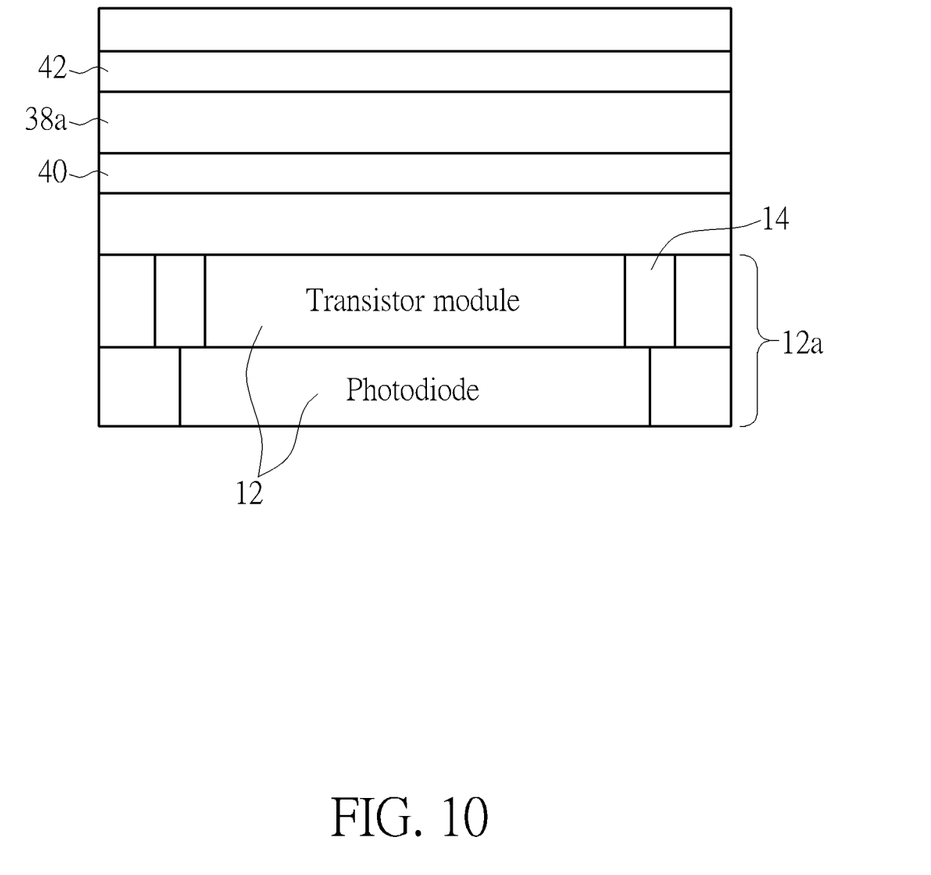
FIG. 10 depicts a sectional view of a pixel binning device and an image sensor pixel.

FIG. 9 depicts an exploded view of a layout of a pixel binning device and a pixel array. FIG. 10 depicts a sectional view of a pixel binning device and an image sensor pixel. The concept of the pixel binning device used in FIG. 9 is described in FIG. 6, the difference between the pixel binning device used in FIG. 9 and FIG. 6 is that the pixel binning device in FIG. 9 has more transistors for coupling more image sensor pixels.

As shown in FIG. 9, the pixel array 10 is a 4×4 array. All image sensor pixels 12 in FIG. 9 are coupled to a pixel binning device 36, meaning all the image sensor pixels 12 in FIG. 9 will be binned into one signal to become one super pixel 1000. The term "super pixel" refers to a group of individual image sensor pixels that are operated in the image sensing and energy collecting modes as a group. In the embodiment of FIG. 9, there is only one super pixel 1000 formed. In other embodiment, the 4×4 array can be divided into four 2×2 arrays. That is, each of the super pixels is formed by binning signals of one 2×2 arrays. Although the pixel array 10 in FIG. 9 is exemplified as a 4×4 array, there can be more columns and row in the pixel array 10, and the way of grouping the image sensor pixels 12 into super pixels 1000 can be based on different requirements.

As shown in FIG. 9 and FIG. 10, transistors of the pixel binning device 36 are respectively stacked and overlap the image sensor pixels 12 to which each of the transistors are coupled. For example, the transistor 38a is stacked on and overlaps the image sensor pixel 12a, and the transistor 38b is stacked on and overlaps the image sensor pixel 12b. Since the pixel binning device 36 is applied to a BSI image sensor, the incident light will thereby not be blocked by the transistors in the pixel binning device 36. A common select line 42 couples to gates of all the transistors of the pixel binning device 36, allowing all gates of the transistors to be switched on or off simultaneously. A binning circuit 40 couples to drains of all the transistors of the pixel binning device 36. Therefore, signals received by each of the transistors in the pixel binning device 36 are binned together to become one signal. The binning circuit 40 and the common select line 42 can stack on and overlap the circuits such as a sensing line 14 or a select line 16 of the pixel array 10.

As shown in FIG. 10, a transistor 38a is stacked on the image sensor pixel 12a. The binning circuit 40 and the common select line 42 can be disposed on or below the transistor 38a. In FIG. 10, the binning circuit 40 is below the transistor 38a and the common selected line 42 is on the transistor 38a. The image sensor pixel 12a may be formed at the front end of the line, and the transistor 38a, the common select line 42, and the binning circuit 40 may be formed at the back end of the line. The transistor 38a may be an OSFET formed within an interlayer dielectric layer (ILD) or an inter-metal dielectric layer (IMD). The OSFET may include an oxide semiconductor layer made of, for example but not limited to, three-component metal oxide such as In—Ga—Zn-based oxide (also referred to as IGZO) or a c-axis aligned crystalline oxide semiconductor (CAAC-OS) material. The oxide semiconductor layer functions as a semiconductor channel of a transistor and can be manufactured at the back end of the line. Therefore, OSFETs exhibit excellent process compatibility with silicon-based semiconductor process. Besides, since the OSFETs suppress short channel effect, they have the advantage of extremely low off-state current. Therefore, power consumption is efficaciously and extraordinarily reduced.

The pixel binning device of the present invention can be combined with a pixel array by simply stacking on the pixel array or being arranged next to the pixel array. The original process of the pixel array will not be influenced by the fabricating process of the pixel binning device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor, comprising:
   a first pixel comprising a first photodiode and a first transistor module, wherein the first transistor module couples to the first photodiode to receive a first signal sensed by the first photodiode;
   a second pixel comprising a second photodiode and a second transistor module, wherein the second transistor module couples to the second photodiode to receive a second signal sensed by the second photodiode; and
   a pixel binning device comprising a first transistor, a second transistor and a binning circuit, wherein the first transistor switchably couples to the first transistor module to transfer the first signal, the second transistor switchably couples to the second transistor module to transfer the second signal, the binning circuit couples to the first transistor and the second transistor to bin the first signal and the second signal, and the first transistor and the second transistor are simultaneously turned on or off.

2. The image sensing structure of claim 1, further comprising:
a first sensing line coupling to the first transistor module, wherein the first sensing line transfers the first signal when the first transistor is switched off; and
a second sensing line coupling to the second transistor module, wherein the second sensing line transfers the second signal when the second transistor is switched off.

3. The image sensor of claim 2, wherein the first sensing line does not couple to the second sensing line.

4. The image sensor of claim 2, wherein a common select line stacks on the first sensing line.

5. The image sensor of claim 1, wherein the first signal does not bin with the second signal when the first transistor and the second transistor are turned off.

6. The image sensor of claim 1, further comprising:
a common select line coupling to the first transistor and the second transistor to simultaneously turn on or off the first transistor and the second transistor.

7. The image sensor of claim 1, wherein the first transistor stacks on the first pixel, and the first transistor overlaps the first pixel.

8. The image sensor of claim 1, wherein the first transistor module comprises a three-transistor image module or a two-transistor image module.

9. The image sensor of claim 1, wherein when the image sensor is in video mode, the first transistor and the second transistor are turned on, and when the image sensor is in photography mode, the first transistor and the second transistor are turned off.

10. An image sensor, comprising:
a first pixel comprising a first photodiode and a first transistor module, wherein the first transistor module couples to the first photodiode to receive a first signal sensed by the first photodiode;
a first sensing line coupling to the first transistor module to transfer the first signal to a readout circuitry;
a second pixel comprising a second photodiode and a second transistor module, wherein the second transistor module couples to the second photodiode to receive a second signal sensed by the second photodiode;
a third pixel comprising a third photodiode and a third transistor module, wherein the third transistor module couples to the third photodiode to receive a third signal sensed by the third photodiode;
a pixel binning device comprising a second transistor, a third transistor and a binning circuit, wherein the second transistor switchably couples to the second transistor module to transfer the second signal, the third transistor switchably couples to the third transistor module to transfer the third signal, and the binning circuit couples to the second transistor, the third transistor and the first sensing line to bin the third signal, the second signal and the first signal, and wherein the second transistor and the third transistor are simultaneously turned on or off.

11. The image sensor of claim 10, further comprising:
a common select line coupling to the second transistor and the third transistor to simultaneously turn on or off the second transistor and the third transistor.

12. The image sensor of claim 10, further comprising:
a second sensing line coupling to the second transistor module, wherein the second transistor module transfers the second signal to the readout circuitry when the second transistor is switched off.

13. The image sensor of claim 12, wherein the first sensing line does not couple to the second sensing line.

14. The image sensor of claim 10, wherein the first signal does not bin with the second signal when the second transistor is turned off.

15. The image sensor of claim 10, wherein the second transistor stacks on the second pixel, and the second transistor overlaps the second pixel.

16. The image sensor of claim 10, wherein the first transistor module comprises at least one first readout transistor, and the second transistor module comprises at least one second readout transistor.

17. The image sensor of claim 10, wherein when the image sensor is in video mode, the second transistor is turned on, and when the image sensor is in photography mode, the second transistor is turned off.

* * * * *